(12) United States Patent
Malapati et al.

(10) Patent No.: US 10,160,417 B2
(45) Date of Patent: Dec. 25, 2018

(54) ROTATABLY SUPPORTED AIRBAG

(71) Applicant: Ford Global Technologies, LLC, Dearborn, MI (US)

(72) Inventors: Srinivas Reddy Malapati, Novi, MI (US); Gustavo Morales Cabrera, Ecatepec de Morelos (MX); Luis Enrique Castillo Jaime, Distrito Federal (MX); Jorge Carlos Tellez Valdes, Calimaya (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/492,755

(22) Filed: Apr. 20, 2017

(65) Prior Publication Data
US 2018/0304847 A1    Oct. 25, 2018

(51) Int. Cl.
| | | |
|---|---|---|
| *B60R 21/16* | (2006.01) | |
| *B60R 21/205* | (2011.01) | |
| *B60R 21/264* | (2006.01) | |
| *B60R 21/00* | (2006.01) | |

(52) U.S. Cl.
CPC .......... *B60R 21/264* (2013.01); *B60R 21/205* (2013.01); *B60R 2021/0009* (2013.01); *B60R 2021/161* (2013.01)

(58) Field of Classification Search
CPC . B60R 21/16; B60R 21/205; B60R 2021/161; B60R 2021/162; B60R 2021/0009
See application file for complete search history.

(56) References Cited

U.S. PATENT DOCUMENTS

| | | | | |
|---|---|---|---|---|
| 4,951,963 | A * | 8/1990 | Behr | ........................ B60R 21/02 280/752 |
| 5,344,184 | A * | 9/1994 | Keeler | .................. B60R 21/045 280/730.1 |
| 5,360,231 | A | 11/1994 | Adams | |
| 5,842,738 | A * | 12/1998 | Knoll | ..................... B60R 21/207 297/216.12 |
| 6,024,377 | A * | 2/2000 | Lane, Jr. | .................. B60R 21/20 280/728.3 |
| 7,494,152 | B2 * | 2/2009 | Schuler | ................. B60R 21/013 280/752 |

(Continued)

FOREIGN PATENT DOCUMENTS

| | | |
|---|---|---|
| ES | 2332622 A1 | 2/2010 |
| KR | 100208839 B1 | 4/1999 |

(Continued)

OTHER PUBLICATIONS

Search Report from United Kingdom Intellectual Property Office dated Oct. 3, 2018 regarding Application No. GB1806321.4 (4 pages).

*Primary Examiner* — Barry Gooden, Jr.
(74) *Attorney, Agent, or Firm* — Frank A. MacKenzie; Bejin Bieneman PLC

(57) ABSTRACT

An assembly includes a base having a pinion. The assembly includes an airbag supported by the base. The assembly includes a rack configured to engage the pinion. The assembly includes a pyrotechnic device configured to move the rack relative to the base and cause the rack to engage the pinion and rotate the base upon actuation of the pyrotechnic device.

20 Claims, 10 Drawing Sheets

(56) References Cited

U.S. PATENT DOCUMENTS

| | | | |
|---|---|---|---|
| 7,540,531 B2* | 6/2009 | Sakakibara | B60R 21/206 280/728.3 |
| 7,874,576 B2 | 1/2011 | Gandhi | |
| 8,910,971 B1 | 12/2014 | Faruque et al. | |
| 9,908,496 B2* | 3/2018 | Choi | B60R 21/0136 |
| 9,919,673 B2* | 3/2018 | Ohno | B60R 21/207 |
| 9,963,101 B2* | 5/2018 | El-Jawahri | B60R 21/233 |
| 2006/0284400 A1* | 12/2006 | Sakakibara | B60R 21/206 280/728.2 |
| 2007/0102908 A1* | 5/2007 | Schuler | B60R 21/013 280/732 |
| 2010/0127483 A1* | 5/2010 | Seo | B60R 21/207 280/730.2 |
| 2017/0088086 A1* | 3/2017 | El-Jawahri | B60R 21/233 |
| 2017/0136976 A1* | 5/2017 | Ohno | B60N 2/888 |

FOREIGN PATENT DOCUMENTS

| | | | |
|---|---|---|---|
| KR | 2010026791 A | 3/2010 | |
| WO | WO 200144026 A1 | 6/2001 | |
| WO | 2005049384 A1 | 6/2005 | |

* cited by examiner

ROTATABLY SUPPORTED AIRBAG

BACKGROUND

A vehicle may include a variety of airbags that can deploy during a vehicle impact to absorb energy and control movement of an occupant of the vehicle. The airbag may be a component of an airbag assembly including a housing supporting the airbag, and an inflator in fluid communication with the airbag for inflating the airbag from an uninflated position to an inflated position. Airbag assemblies may be supported by a steering wheel of the vehicle, an instrument panel of the vehicle, a headliner of the vehicle, etc.

The vehicle may include an impact sensing system in communication with the airbag assembly for sensing the vehicle impact and instructing the inflator to inflate the airbag when the vehicle impact is sensed. The impact sensing system may sense a direction of the impact and may selectively inflate, or not inflate, certain airbags of the vehicle or extensions of the airbag based on the type and magnitude of impact that is sensed, e.g., based on direction, magnitude, etc.

Airbags may be designed to protect an occupant based on a fixed orientation of an occupant of the vehicle. For example, an airbag housed within a vehicle steering wheel may protect an occupant of a driver's seat in a front impact collision, where the occupant, and the driver's seat, are oriented to face the steering wheel.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in a front corner of the vehicle at an oblique angle with a rigid barrier. In this test, the test dummy in the driver seat is urged forwardly and toward the impacted corner of the vehicle. Another type of impact test is the angular impact test, in which the test dummy in the driver seat is urged in a cross-vehicle direction toward the driver side door of the vehicle or toward the passenger side door of the vehicle.

DETAILED DESCRIPTION

Figure 1:
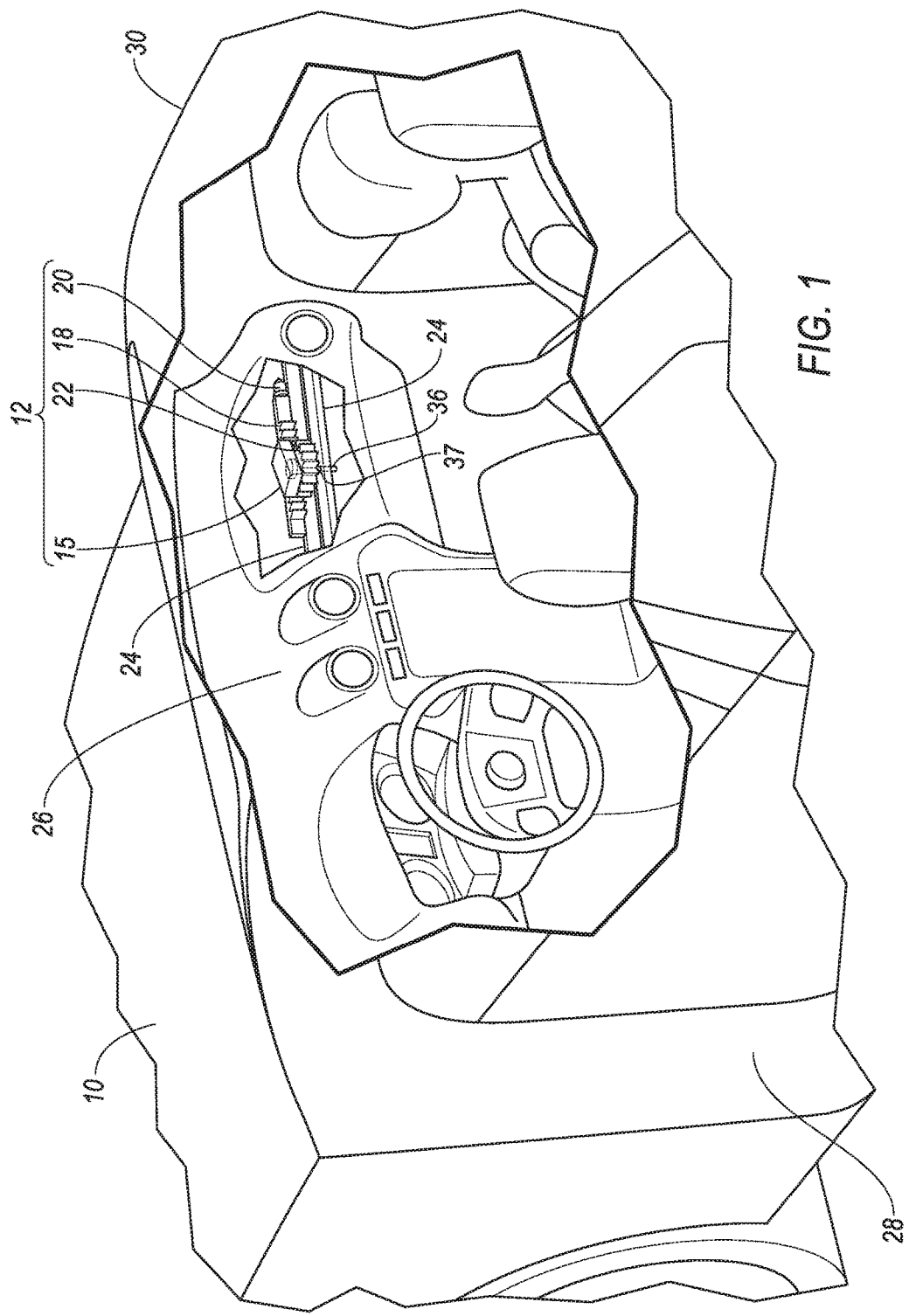
FIG. 1 is a perspective view of a portion a vehicle cut away to reveal an interior of the vehicle and a system for controlling airbag deployment in an instrument panel.

An assembly includes a base having a pinion and an airbag supported by the base. The assembly includes a rack configured to engage the pinion. The assembly includes a pyrotechnic device configured to move the rack relative to the base and cause the rack to engage the pinion and rotate the base upon actuation of the pyrotechnic device.

The rack may include a distal end. The pyrotechnic device may be disposed at the distal end.

Actuation of the pyrotechnic device may cause rotation of the base in a first rotational direction.

The assembly may include a second rack configured to engage the pinion. The assembly may include a second pyrotechnic device configured to move the second rack relative to the base and cause the second rack to engage the pinion and rotate the base in a second rotational direction upon actuation of the second pyrotechnic device. The first rotational direction may be opposite the second rotational direction.

The rack may be parallel to the second rack. The rack may be configured to engage the pinion at a first location. The second rack may be configured to engage the pinion at a second location. The first location and second location may be separated from each other on the pinion by 180 degrees.

The rack may include a center, a distal end, and a hole extending from the distal end toward the center of the rack. The pyrotechnic device may be disposed within the hole.

The rack may include a second distal end opposite the distal end and a second hole extending from the second distal end toward the center of the rack. The assembly may include a second pyrotechnic device disposed within the second hole.

A vehicle includes a vehicle component and a base rotatably supported by the vehicle component. The base has a pinion. The vehicle includes an airbag supported by the base. The vehicle includes a rack configured to engage the pinion. The vehicle includes a pyrotechnic device configured to move the rack relative to the base and cause the rack to engage the pinion and rotate the base in a rotational direction upon actuation of the pyrotechnic device.

The vehicle may include a passenger side of the vehicle and a driver side of the vehicle. The base may rotate to direct deployment of the airbag toward one of the passenger side of the vehicle and the driver side of the vehicle.

The base may rotate to direct deployment of the airbag away from a longitudinal direction of the vehicle and toward a toward a latitudinal direction of the vehicle.

The vehicle may include a vehicle controller programmed to actuate the pyrotechnic device in response to detecting an oblique vehicle impact.

The rack may include a distal end and the pyrotechnic device is disposed at the distal end.

The vehicle may include a second rack configured to engage the pinion. The vehicle may include a second pyrotechnic device configured to move the second rack relative to the base and cause the second rack to engage the pinion and rotate the base in a second rotational direction upon actuation of the second pyrotechnic device. The rotational direction may be opposite the second rotational direction.

The vehicle may include a first side opposite a second side. Rotation of the base in the rotational direction may direct deployment of the airbag toward the first side of the vehicle. Rotation of the base in the second rotational direction may direct deployment of the airbag toward the second side of the vehicle.

The vehicle may include a vehicle controller programmed to actuate the pyrotechnic device in response to detecting an oblique impact on the first side of the vehicle, and to actuate the second pyrotechnic device in response to detecting an oblique impact on the second side of the vehicle.

The rack may include a center, a distal end, and a hole extending from the distal end toward the center of the rack. The pyrotechnic device may be disposed within the hole.

The rack may include a second distal end opposite the distal end and a second hole extending from the second distal end toward the center of the rack. The may include a second pyrotechnic device disposed within the second hole.

The vehicle may include a first side opposite a second side. Actuation of the pyrotechnic device may direct deployment of the airbag toward the first side of the vehicle. Actuation of the second pyrotechnic device may direct deployment of the airbag toward the second side of the vehicle.

The vehicle may include a vehicle controller programmed to actuate the pyrotechnic device in response to detecting an oblique impact on the first side of the vehicle. The vehicle controller may be programmed to actuate the second pyrotechnic device in response to detecting an oblique impact on the second side of the vehicle.

The vehicle component may be an instrument panel.

In the following description, relative orientations and directions (by way of example, in front, behind, side, top, bottom, right, left, lateral, longitudinal etc.) are from the perspective of the occupant seated in the vehicle 10. The adjectives "first" and "second" are used throughout this document as identifiers and are not intended to signify importance or order.

With reference to the Figures, wherein like numerals indicate like parts throughout the several views, a vehicle 10 includes a vehicle component (described further below) and a restraint assembly 12. The restraint assembly 12 includes a base 14 rotatably supported by the vehicle component, and an airbag 16 supported by the base 14. As set forth further below, the assembly 12 is designed to rotate the base 14 relative to the vehicle component to turn the inflation direction of the airbag 16 based on a sensed direction of an oblique impact. Specifically, the base 14 is rotated to position the airbag 16 to minimize the likelihood of an occupant sliding across the airbag 16 during impact to reduce the potential for head roll.

Figure 2:
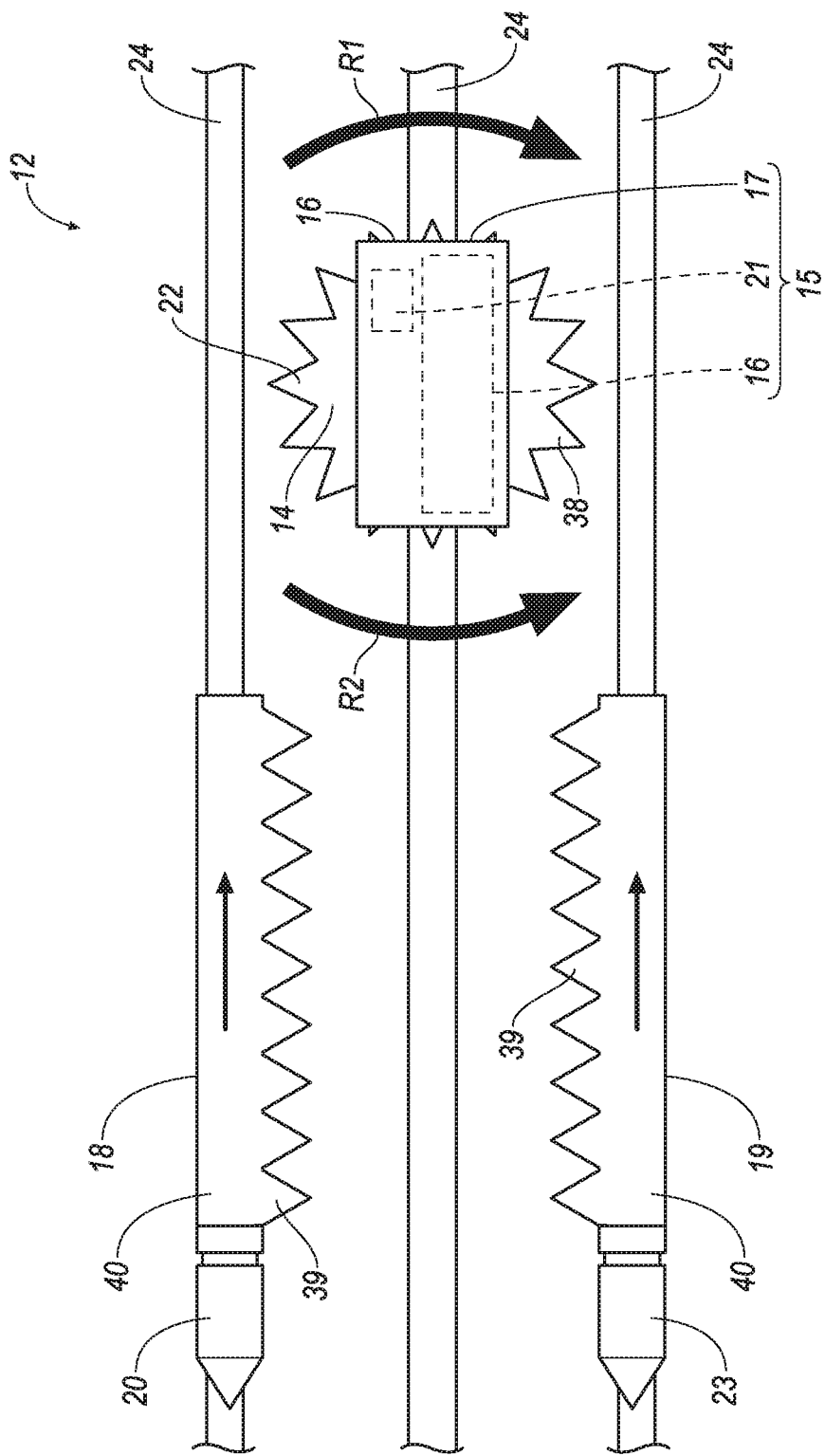
FIG. 2 is a top view of another embodiment of the system for controlling airbag deployment direction including first and second example racks.
Figure 2A:
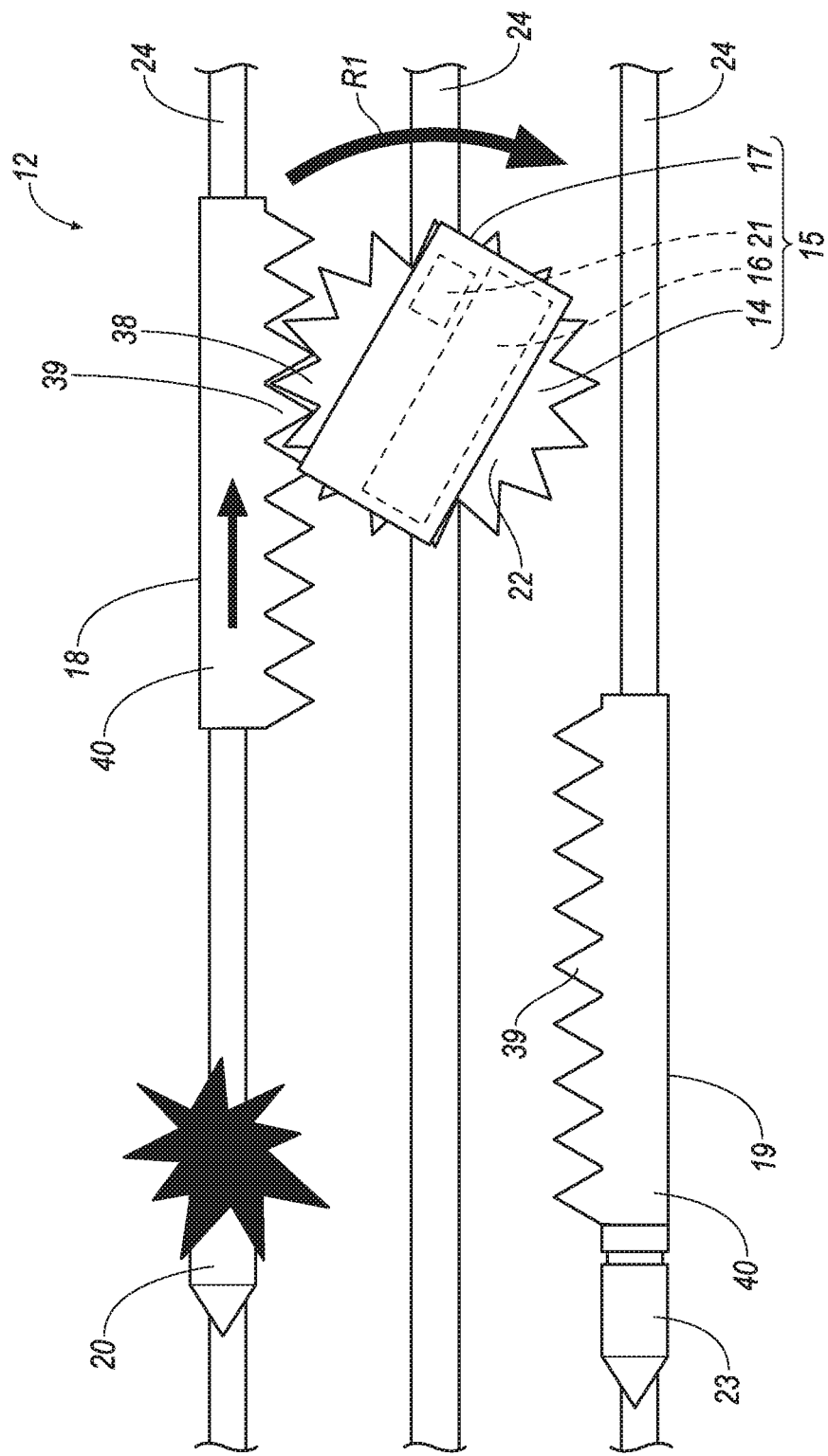
FIG. 2A is a top view of the system of FIG. 2 with the airbag deployment direction rotated in a first rotational direction.
Figure 2B:
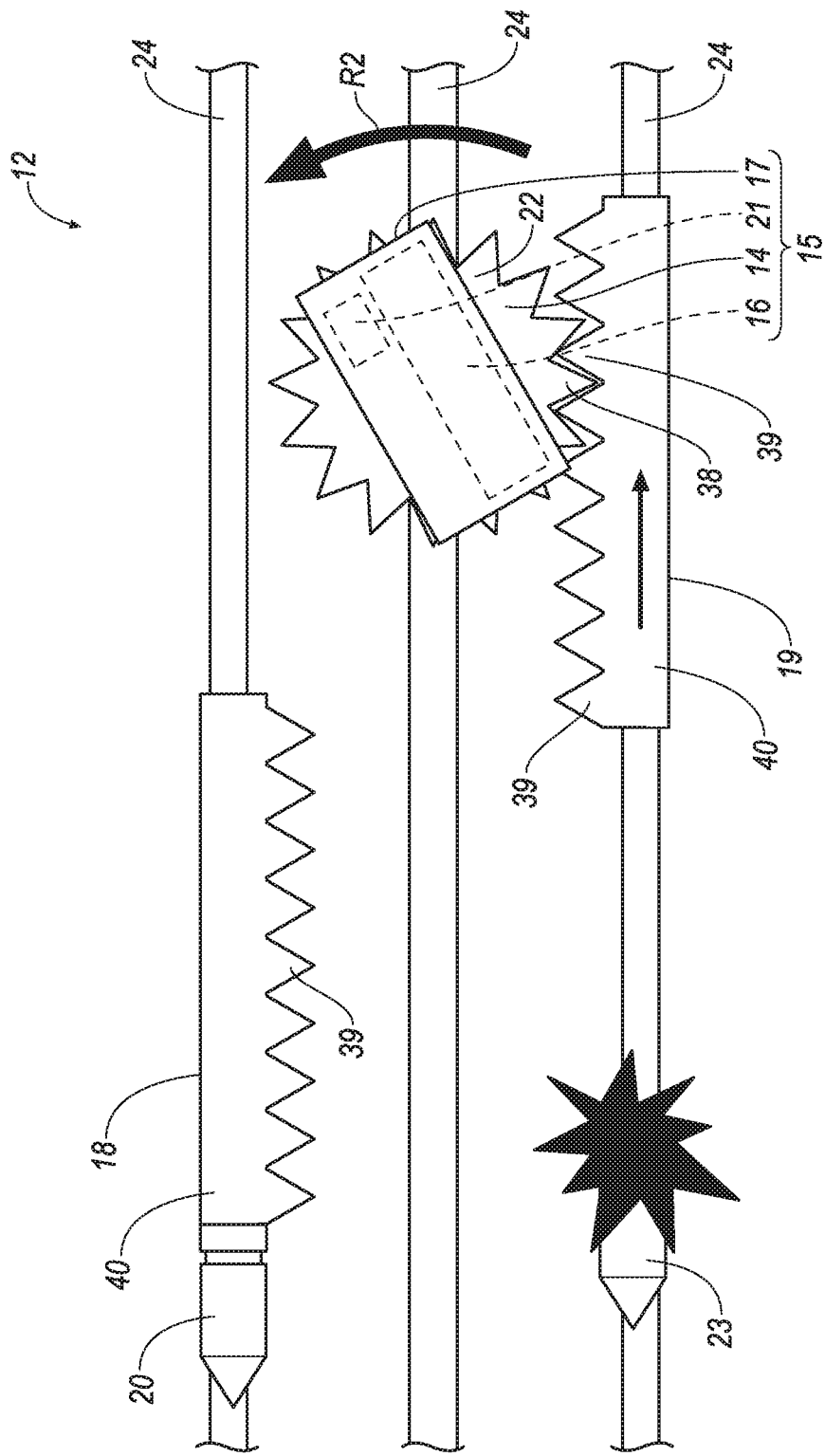
FIG. 2B is a top view of the system of FIG. 2 with the airbag deployment direction rotated in a second rotational direction.
Figure 3:
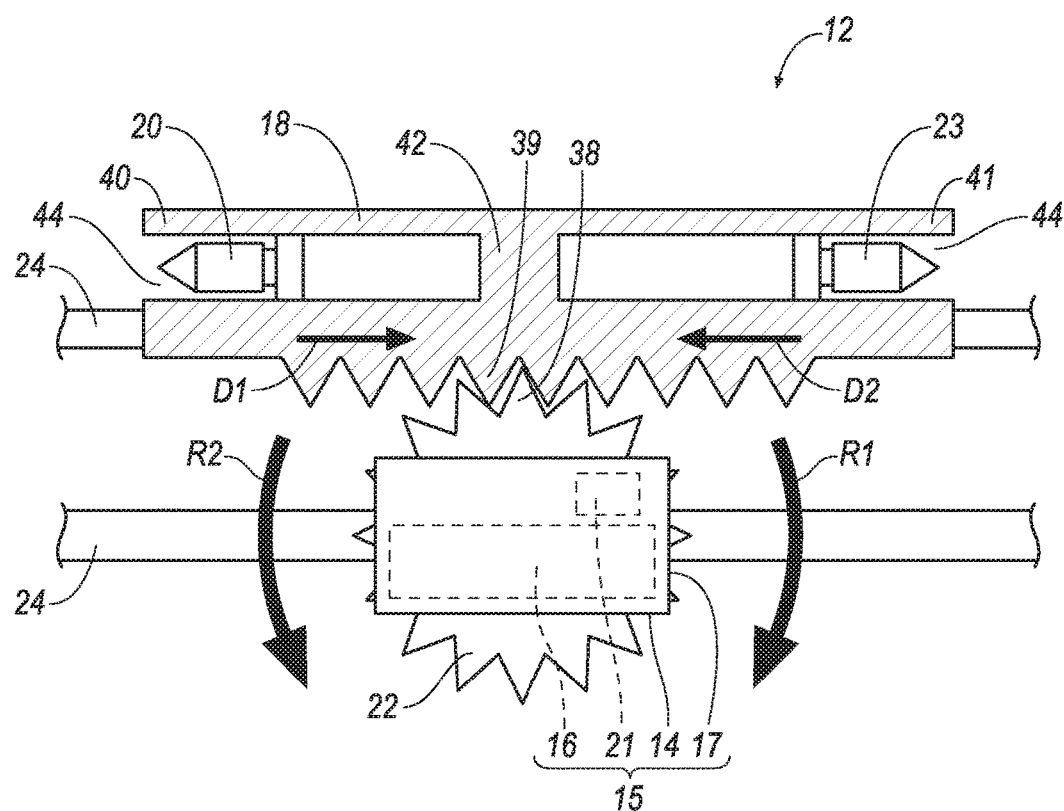
FIG. 3 is a top view and partial cross-sectional view of another embodiment of the system for controlling airbag deployment direction.
Figure 4:
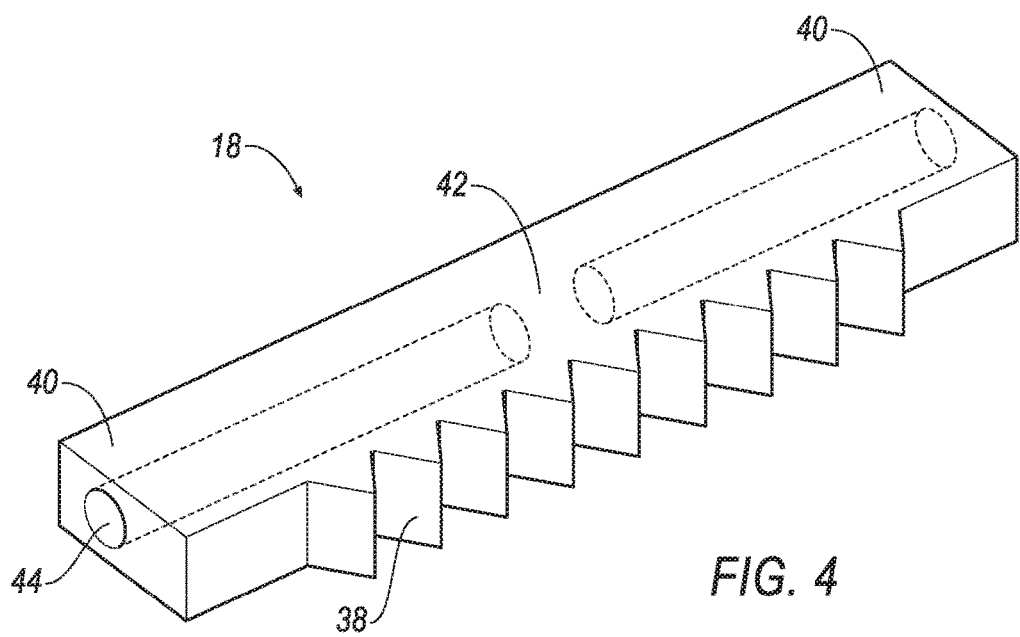
FIG. 4 is a perspective view of the rack of FIG. 3.
Figure 3A:
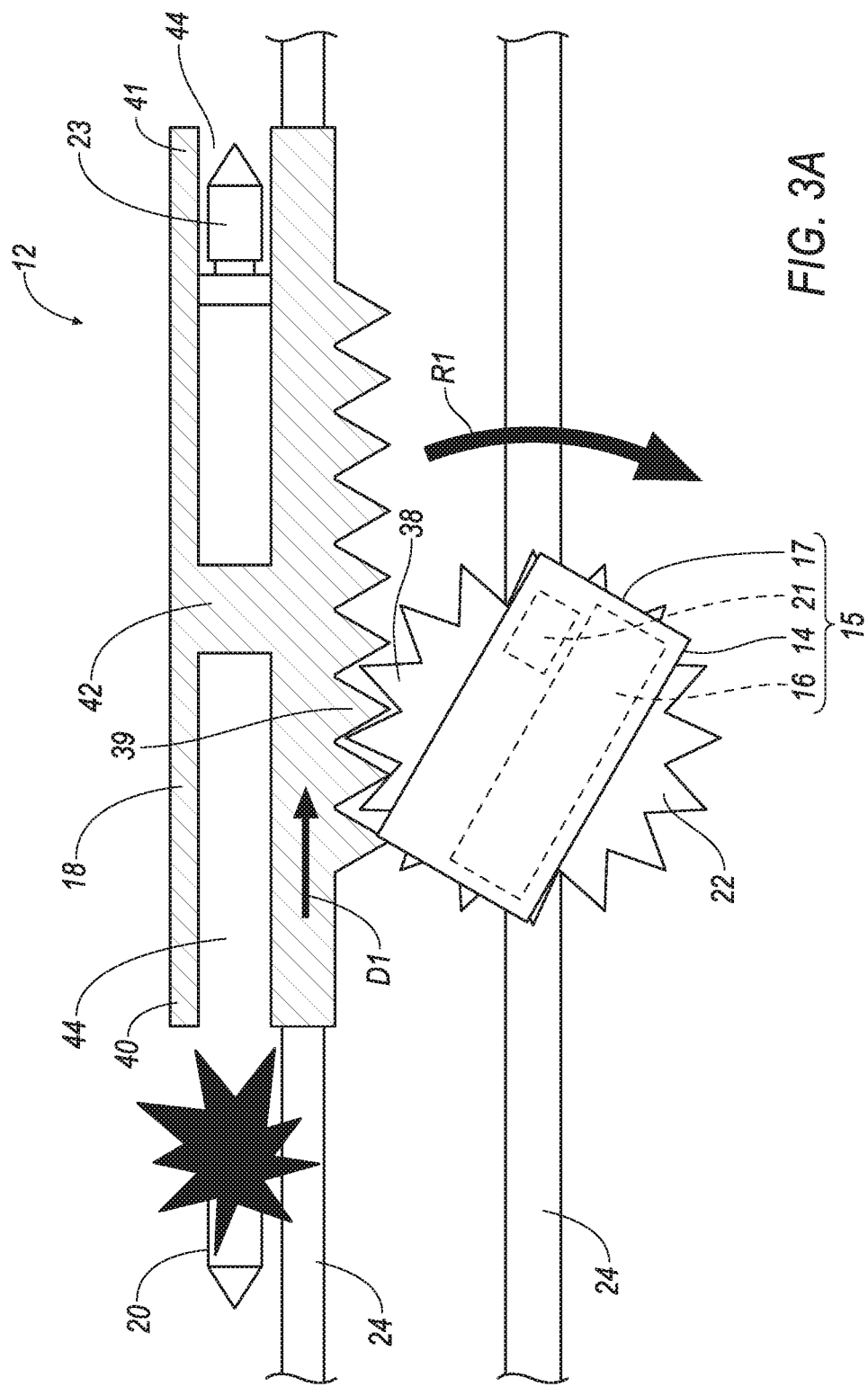
FIG. 3A is a top view of the system of FIG. 3 with the airbag deployment direction rotated in a first rotational direction.
Figure 3B:
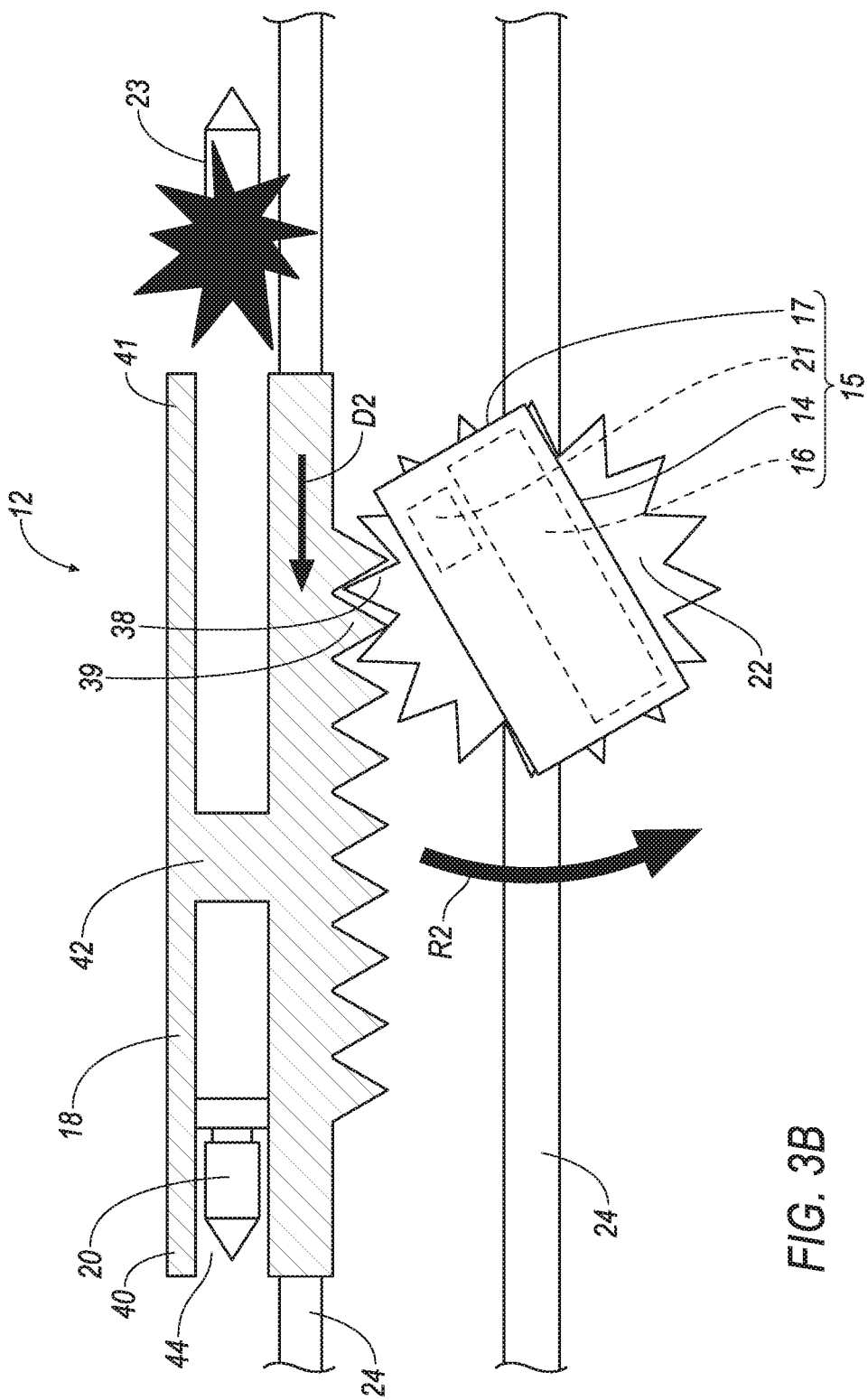
FIG. 3B is a top view of the system of FIG. 3 with the airbag deployment direction rotated in a second rotational direction.

A first embodiment of the assembly 12 is shown in FIG. 1, a second embodiment of the assembly 12 is shown in FIG. 2, and a third embodiment of the assembly 12 is shown in FIGS. 3 and 4. Common numerals are used to identify common features in the embodiments of FIGS. 1-4.

With continued reference to FIG. 1, the vehicle 10 may be any type of passenger or commercial automobile such as a car, a truck, a sport utility vehicle, a crossover vehicle, a van, a minivan, a taxi, a bus, etc. The vehicle 10 may be, for example, an autonomous vehicle that can operate in an autonomous (e.g., driverless) mode, a partially autonomous mode, and/or a non-autonomous mode.

As set forth above, the vehicle 10 includes the vehicle component. For example, the vehicle component may be one or more support beams 24 of an instrument panel 26 of the vehicle 10, as shown in FIGS. 1-3. As another example, the vehicle component may be a steering wheel. Alternatively, the vehicle component may be any suitable component of the vehicle 10 that supports the base 14, the first rack 18, and/or a second rack 19 of the assembly 12.

With reference to FIG. 1, the instrument panel 26 may be disposed at a forward end of a passenger cabin of the vehicle 10 and face toward front seats of the vehicle 10. The instrument panel 26 may support and or include vehicle controls, including the steering wheel.

Figure 6:
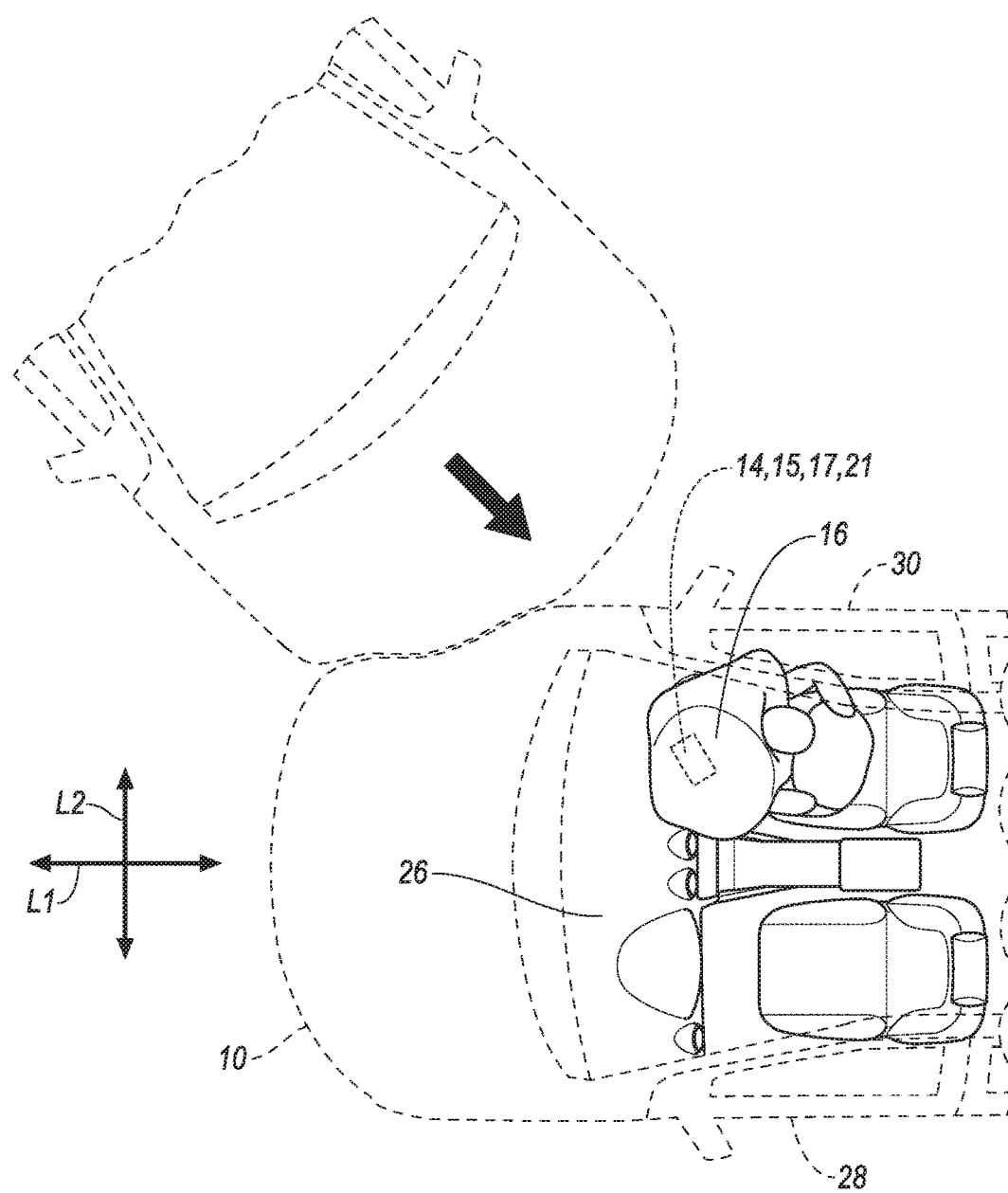
FIG. 6 is a top view of the vehicle experiencing an oblique impact to a passenger side of the vehicle.
Figure 7:
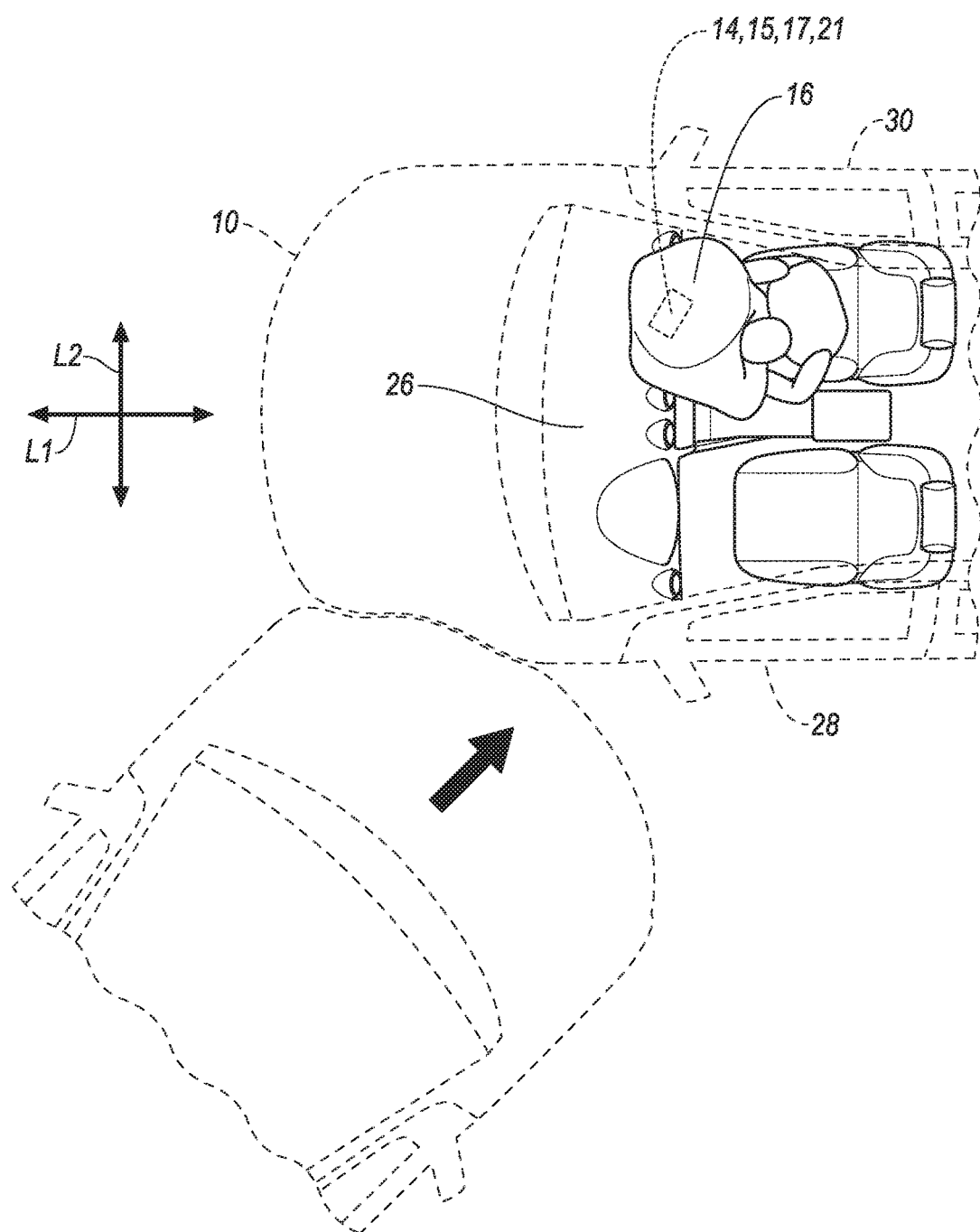
FIG. 7 is a top view of the vehicle experiencing an oblique impact to a driver side of the vehicle.

With reference to FIGS. 1, 6, and 7, the vehicle 10 includes a first side 28 and a second side 30 opposite the first side 28. The first side 28 may be a driver side of the vehicle 10, and the second side 30 may be a passenger side of the vehicle 10. For example, the driver side may be a left side of the vehicle 10, and the passenger side may be a right side of the vehicle 10 in some jurisdictions; and the driver side may be the right side of the vehicle 10, and the passenger side may be the left side of the vehicle 10 in other jurisdictions.

Figure 5:
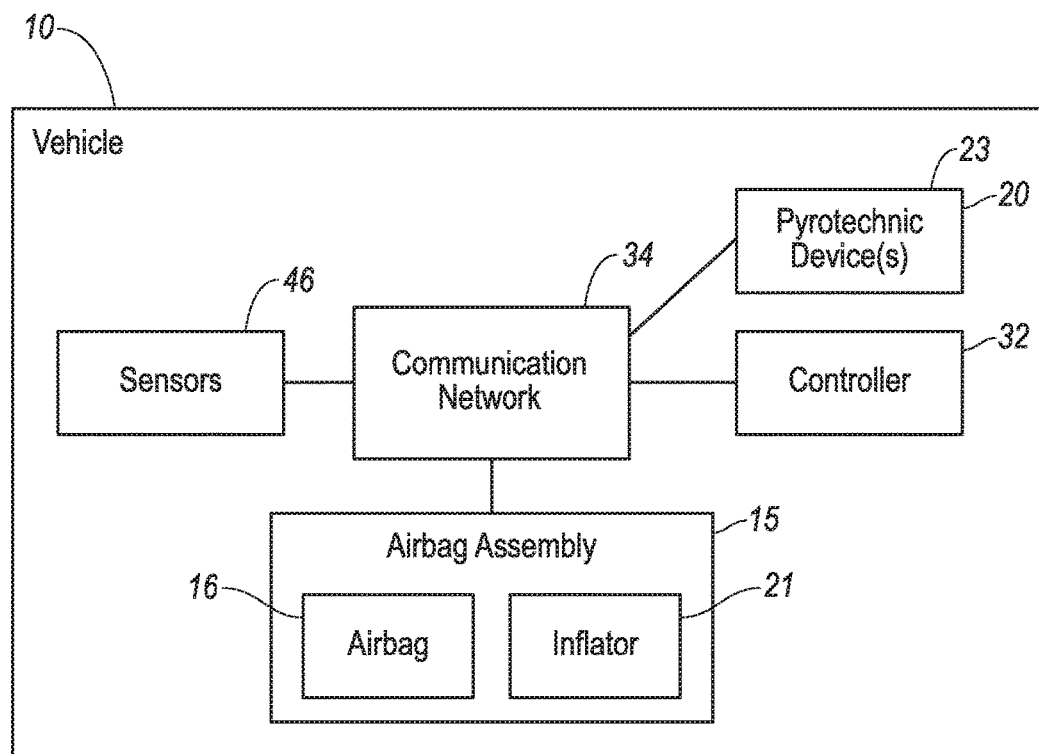
FIG. 5 is a block diagram of a system for controlling airbag deployment.

The vehicle 10 includes an airbag assembly 15. The airbag assembly 15 includes the base 14, the airbag 16, and an inflator 21. The base 14 of the airbag assembly 15 includes a housing 17 that houses the airbag 16 in an uninflated position, as shown in FIGS. 1-3, and supports the airbag 16 in an inflated position, as shown in FIGS. 5-6. The airbag 16 may be rolled and/or folded to fit within the housing 17 in the uninflated position. The housing 17 may be of any suitable material, e.g., a rigid polymer, a metal, a composite, or a combination of rigid materials. The housing 17 of the airbag assembly may be supported by the base 14.

The airbag 16 may be formed of any suitable airbag material, for example, a woven polymer. For example, the airbag 16 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The inflator 21 is supported by the base 14, e.g., in the housing 17. The inflator 21 is connected to the airbag 16. Upon receiving a signal, e.g., from a vehicle controller 32 via a communication network 34, the inflator 21 may inflate the airbag 16 with an inflatable medium, such as a gas. The inflator 21 may be, for example, a pyrotechnic inflator that uses a chemical reaction to drive inflation medium to the airbag 16. The inflator 21 may be of any suitable type, for example, a cold-gas inflator.

As set forth above, the base 14 is rotatably supported by the vehicle component, e.g., by the support beam 24 of the instrument panel 26. For example, with reference to FIG. 1, the vehicle component, e.g., the support beam 24 of the instrument panel 26, may define a hole 37, and the base 14 may include a pin 36 that is rotatably received by the hole 37. The pin 36 and the hole 37 are sized such that the pin 36 rotates within the hole 37. The airbag 16 rotates with the base 14 when the base 14 rotates relative to the vehicle component.

The base 14 may rotate to direct deployment of the airbag 16 toward one of the first side 28 of the vehicle 10 and the second side 30 of the vehicle 10. For example, the base 14 may rotate about the pin 36 such that from an initial position the base 14 rotates, along with the airbag 16, to change a deployment direction of the airbag 16 to be more closely directed at the passenger side or the driver side as compared to the initial position.

The base 14 may rotate in a first rotational direction R1 and a second rotational direction R2. The first rotational direction R1 is opposite the second rotational direction R2. Rotation of the base 14 in the first rotational direction R1 directs deployment of the airbag 16 toward the first side 28 of the vehicle 10 (see FIG. 7). Rotation of the base 14 in the second rotational direction R2 directs deployment of the airbag 16 toward the second side 30 of the vehicle 10 (see FIG. 6).

The base 14 may rotate to direct deployment of the airbag 16 away from a longitudinal direction L1, i.e., a front to back direction, of the vehicle 10 and toward a toward a latitudinal direction L2, i.e., a cross-vehicle direction, of the vehicle 10. For example, an axial direction of the pin 36 and hole 37 may be aligned with a vertical direction, i.e., the axial direction of the pin 36 and hole 37 may be perpendicular to the longitudinal direction L1 and the latitudinal direction L2. The base 14 may be initially positioned such that deployment of the airbag 16 is directed in the longitudinal direction L1. Rotation of the base 14 about the pin 36 causes the airbag 16 to rotate such that deployment of the airbag 16 is in a direction that is closer to the latitudinal direction L2, as compared to the initial position.

The base 14 includes a pinion 22 fixed to the housing 17. The pinion 22 includes an arcuate set of gear teeth 38. Although shown in the figures as having gear teeth 38 that completely surround the pinion 22, i.e., the gear teeth 38 complete a full 360-degree arc around the pinion 22, the gear teeth 38 need not surround the pinion 22, e.g., the arcuate set of gear teeth 38 may only be provided along a portion of the pinion 22, e.g., the gear teeth 38 may only complete a 90-degree arc. The arc length, e.g., the degrees of the arc length of the set of gear teeth 38, may be determined based on a desired rotation of the base 14, and whether rotation in the first and second directions is desired. For example, if 45 degrees of rotation in a single direction is desired, then the arcuate set of gear teeth 38 should have at least an arc length of 45 degrees. If 45 degrees of rotation in both directions is desired, then the arcuate set of gear teeth 38 should have at least an arc length of 90 degrees.

As set forth above, the first embodiment of the assembly 12 is shown in FIG. 1. In the embodiment shown in FIG. 1, the assembly 12 includes a first rack 18 and a first pyrotechnic device 20. As set forth below, when the first pyrotechnic device 20 is activated, the first pyrotechnic device 20 engages the first rack 18 to move the first rack 18 into engagement with the pinion 22 to rotate the base 14.

The first rack 18 may be supported by the vehicle component, such as the support beam 24. For example, the vehicle component, e.g., the support beam 24, may define a guide, e.g., channel, a track, etc., that guides movement of the first rack 18 in a linear direction when the first pyrotechnic device 20 is activated. The guide, for example, may extend in the latitudinal direction L2 of the vehicle to guide the first rack 18 in the latitudinal direction, i.e., the cross-vehicle direction.

With continued reference to FIG. 1, the first rack 18 includes gear teeth 39. The gear teeth 39 engage the gear teeth 38 of the pinion 22 when the first pyrotechnic device 20 moves the first rack 18 into engage with the pinion 22. The gear teeth 39 of the first rack 18 may be either in contact with or spaced from the gear teeth 38 of the pinion 22 before activation of the first pyrotechnic device 20. The gear teeth 39 of the first rack 18 may have a similar pitch to a pitch of the gear teeth 38 of the pinion 22.

The first rack 18 is configured to engage the pinion 22. Specifically, the first rack 18 is positioned such that when the first pyrotechnic device 20 is activated, the gear teeth 39 of the first rack 18 are meshed with the gear teeth 38 of the pinion and rotates the pinion 22 relative to the vehicle component. Specifically, movement of the first rack 18, e.g., along the vehicle component supporting the first rack 18, causes the gear teeth 39 of the first rack 18 to mesh with the gear teeth 38 of the pinion 22. In the meshed arrangement, linear movement of the first rack 18 causes rotational movement of the pinion 22 via the gear teeth 39 of the first rack 18 and the gear teeth 38 of the pinion 22.

The first pyrotechnic device 20 may be fixed to the vehicle component, e.g., the support beam 24. The first rack 18, for example, includes a distal end 40, and the first pyrotechnic device 20 may engage the first rack 18 at the distal end 40 when the first pyrotechnic device 20 is activated. The first pyrotechnic device 20 may be either spaced from or in contact with the distal end 40 before the first pyrotechnic device 20 is activated.

The first pyrotechnic device 20 includes a pyrotechnic material that detonates upon actuation of the first pyrotechnic device 20, e.g., upon receipt of a command, such as an electrical pulse, from the vehicle controller 32, e.g., via the communication network 34. For example, the first pyrotechnic device 20 may contain sufficient pyrotechnic material and be placed in a position and orientation such that an expansion of the first pyrotechnic device 20 upon actuation and subsequent detonation urges the first rack 18 to move relative to the pinion 22, such movement transferring the movement of the first rack 18 into rotational motion of the base 14, e.g., via the gear teeth 39 of the first rack 18 engaging the gear teeth 38 of the pinion 22.

As set forth above, a second embodiment of the assembly 12 is shown in FIG. 2. As shown in FIG. 2, the second embodiment of the assembly 12 may include a second rack 19 and a second pyrotechnic device 23. In this embodiment, when the first pyrotechnic device 20 is activated, the first pyrotechnic device 20 engages the first rack 18 to rotate the pinion 22 in a first direction relative to the base 14, i.e., clockwise in FIG. 2. When the second pyrotechnic device 23 is activated, the second pyrotechnic device 23 engages the second rack 19 to rotate the pinion in a second direction relative to the base 14, i.e., counter-clockwise in FIG. 2.

The second rack 19 is configured to engage the pinion 22 in a similar fashion to the first rack 18. The second rack 19 may be supported by the vehicle component, such as the support beam 24, in a similar fashion as the first rack 18.

The second pyrotechnic device 23 may interact with the second rack 19 in a similar fashion as the interaction of the first pyrotechnic device 20 and the first rack 18 described above. For example, the second rack 19 may include a distal end 40, and the second pyrotechnic device 23 may be disposed at the distal end 40 of the second rack 19, such that, when the second pyrotechnic device 23 is activated, the second pyrotechnic device 23 moves the second rack 19 relative to the base 14, e.g. along the vehicle component, and causes the second rack 19 to engage the pinion 22, as described above. The second pyrotechnic device 23 may be of the same type as the first pyrotechnic device 20.

As shown in FIG. 2, the first rack 18 and the second rack 19 may be spaced from each other on opposite sides of the pinion 22. In other words, the first rack 18 may engage the pinion 22 at a first location, and the second rack 19 may engage the pinion 22 at a second location spaced from the first location by 180 degrees around the pinion 22. The first rack 18, and the second rack 19 may be parallel to each other. The direction of travel of the first rack 18 along the vehicle component if moved by the first pyrotechnic device 22 may be parallel with the direction of travel of the second rack 19 along the vehicle component if moved by the second pyrotechnic device 23.

As set forth above, a third embodiment of the assembly 12 is shown in FIGS. 3 and 4. As shown in FIGS. 3 and 4, the first rack 18 may include a center 42, a distal end 40, and a hole 44 extending from the distal end 40 toward the center 42 of the first rack 18. The first rack 18 may include a second distal end 41 opposite the distal end 40 and a second hole 44 extending from the second distal end 41 toward the center 42 of the first rack 18.

As shown in FIG. 3, the first pyrotechnic device 20 may be disposed within the hole 44 at the first distal end 40 of the first rack 18, the second pyrotechnic device 23 may be disposed within the second hole 44 extending from the second distal end 41. In this embodiment, activation of the first pyrotechnic device 20 urges the first rack 18 along the vehicle component, e.g., in a first direction D1. When moved in the first direction D1, the first rack 18 engages the pinion 22 to rotate the base 14 in the first rotational direction R1. Accordingly, actuation of the first pyrotechnic device 20 may direct deployment of the airbag 16 toward the first side 28 of the vehicle 10. Activation of the second pyrotechnic device 23 urges the first rack 18 along the vehicle component, e.g., in a second direction D2. The second direction D2 may be opposite of the first direction D1. When moved in the second direction D2, the first rack 18 may engage the base 14 to rotate the base 14 in the second rotational direction R2. Accordingly, actuation of the second pyrotechnic device 23 may direct deployment of the airbag toward the second side 30 of the vehicle 10.

The communication network 34 includes hardware, such as a communication bus, for facilitating communication among vehicle components, e.g., between the vehicle controller 32, the inflator, the first pyrotechnic device 20, the second pyrotechnic device 23, and sensors 46. The communication network 34 may facilitate wired or wireless communication among the vehicle components in accordance with a number of communication protocols such as controller area network (CAN), Ethernet, WiFi, Local Interconnect Network (LIN), and/or other wired or wireless mechanisms.

The vehicle 10 may include impact sensors 46. The impact sensors 46 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 46 may be located at numerous points in or on the vehicle 10. The impact sensors 46 may be in communication with the vehicle controller 32, e.g., via the communication network 34.

The vehicle controller 32 is implemented via circuits, chips, or other electronic components for carrying out various operations, including as described herein. The vehicle controller 32 is a computing device that generally includes a processor and a memory, the memory including one or more forms of computer-readable media, and storing instructions executable by the processor for performing various operations, including as disclosed herein. The memory of the vehicle controller 32 further generally stores remote data received via various communications mechanisms; e.g., the vehicle controller 32 is generally configured for communications on a controller area network (CAN) bus or the like, and/or for using other wired or wireless protocols, e.g., Bluetooth, etc. The vehicle controller 32 may also have a connection to an onboard diagnostics connector (OBD-II). Via the communication network 34 using Ethernet, WiFi, the CAN bus, Local Interconnect Network (LIN), and/or other wired or wireless mechanisms, the vehicle controller 32 may transmit messages to various devices in the vehicle 10 and/or receive messages from the various devices, e.g., controllers, actuators, sensors, etc., e.g., controllers and sensors as discussed herein. For example, the vehicle controller 32 may receive data from vehicle 10 impact sensors 46 and send messages and commands to the airbag 16 and pyrotechnic device(s) 20. Although one vehicle controller 32 is shown in FIG. 5 for ease of illustration, it is to be understood that the vehicle controller 32 could include, and various operations described herein could be carried out by, one or more computing devices.

The vehicle controller 32 may be programmed to identify whether the vehicle 10 has received an oblique impact, e.g., on the first side 28 and/or the second side 30. During the oblique impact, the occupant may move forward and laterally. The vehicle controller 32 may make such identification based on information received from the impact sensors 46, e.g., via the communication network 34, such as impact sensors 46 supported on the first side 28 and/or the second side 30 of the vehicle 10 proving information indicating an impact on such side, an accelerometer providing information indicating an acceleration direction relative to an orientation of the vehicle 10, etc.

The vehicle controller 32 may be programmed to actuate the first pyrotechnic device 20 and/or second pyrotechnic device 23. For example, the vehicle controller 32 may transmit an actuation command to the first pyrotechnic device 20 and/or second pyrotechnic device 23 via the communication network 34. The vehicle controller 32 may transmit the command to the first pyrotechnic device 20 and/or second pyrotechnic device 23 in response to detecting an oblique vehicle impact, e.g., based on information received from the sensors 46. The vehicle controller 32 may be programmed to actuate the first pyrotechnic device 20 in response to detecting an oblique impact on the first side 28 of the vehicle 10, and to actuate the second pyrotechnic device 23 in response to detecting an oblique impact on the second side 30 of the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
    a base having a pinion;
    an airbag supported by the base;
    a rack configured to engage the pinion; and
    a pyrotechnic device configured to move the rack relative to the base and cause the rack to engage the pinion and rotate the base upon actuation of the pyrotechnic device.

2. The assembly of claim 1, wherein the rack includes a distal end and the pyrotechnic device is disposed at the distal end.

3. The assembly of claim 1, wherein the actuation of the pyrotechnic device causes rotation of the base in a first rotational direction, and further comprising a second rack configured to engage the pinion and a second pyrotechnic device configured to move the second rack relative to the base and cause the second rack to engage the pinion and rotate the base in a second rotational direction upon actuation of the second pyrotechnic device, wherein the first rotational direction is opposite the second rotational direction.

4. The assembly of claim 3, wherein the rack is parallel to the second rack.

5. The assembly of claim 4, wherein the rack is configured to engage the pinion at a first location, and the second rack is configured to engage the pinion at a second location, the first location and second location separated from each other on the pinion by 180 degrees.

6. The assembly of claim 1, wherein the rack includes a center, a distal end, and a hole extending from the distal end toward the center of the rack, the pyrotechnic device disposed within the hole.

7. The assembly of claim 6, further comprising a second pyrotechnic device, the rack further comprising a second distal end opposite the distal end and a second hole extending from the second distal end toward the center of the rack, the second pyrotechnic device disposed within the second hole.

8. A vehicle comprising:
a vehicle component;
a base rotatably supported by the vehicle component and having a pinion;
an airbag supported by the base;
a rack configured to engage the pinion; and
a pyrotechnic device configured to move the rack relative to the base and cause the rack to engage the pinion and rotate the base in a rotational direction upon actuation of the pyrotechnic device.

9. The vehicle of claim 8, further comprising a passenger side of the vehicle and a driver side of the vehicle, wherein the base rotates to direct deployment of the airbag toward one of the passenger side of the vehicle and the driver side of the vehicle.

10. The vehicle of claim 8, wherein the base rotates to direct deployment of the airbag away from a longitudinal direction of the vehicle and toward a latitudinal direction of the vehicle.

11. The vehicle of claim 8, further comprising a vehicle controller programmed to actuate the pyrotechnic device in response to detecting an oblique vehicle impact.

12. The vehicle of claim 8, wherein the rack includes a distal end and the pyrotechnic device is disposed at the distal end.

13. The vehicle of claim 8, further comprising a second rack configured to engage the pinion and a second pyrotechnic device configured to move the second rack relative to the base and cause the second rack to engage the pinion and rotate the base in a second rotational direction upon actuation of the second pyrotechnic device, wherein the rotational direction is opposite the second rotational direction.

14. The vehicle of claim 13, the vehicle further comprising a driver side opposite a passenger side, wherein rotation of the base in the rotational direction directs deployment of the airbag toward the driver side of the vehicle, and rotation of the base in the second rotational direction directs deployment of the airbag toward the passenger side of the vehicle.

15. The vehicle of claim 14, further comprising a vehicle controller programmed to actuate the pyrotechnic device in response to detecting an oblique impact on the driver side of the vehicle, and to actuate the second pyrotechnic device in response to detecting an oblique impact on the passenger side of the vehicle.

16. The vehicle of claim 8, the rack further comprising a center, a distal end, and a hole extending from the distal end toward the center of the rack, the pyrotechnic device disposed within the hole.

17. The vehicle of claim 16, further comprising a second pyrotechnic device, the rack further comprising a second distal end opposite the distal end and a second hole extending from the second distal end toward the center of the rack, the second pyrotechnic device disposed within the second hole.

18. The vehicle of claim 17, further comprising a first side opposite a second side, wherein actuation of the pyrotechnic device directs deployment of the airbag toward the first side of the vehicle, and actuation of the second pyrotechnic device directs deployment of the airbag toward the second side of the vehicle.

19. The vehicle of claim 18, further comprising a vehicle controller programmed to actuate the pyrotechnic device in response to detecting an oblique impact on the first side of the vehicle, and to actuate the second pyrotechnic device in response to detecting an oblique impact on the second side of the vehicle.

20. The vehicle of claim 8, wherein the vehicle component is an instrument panel.

* * * * *